(12) United States Patent
Stewart

(10) Patent No.: US 11,755,668 B1
(45) Date of Patent: Sep. 12, 2023

(54) APPARATUS AND METHOD OF PERFORMANCE MATCHING

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/695,088

(22) Filed: Mar. 15, 2022

(51) Int. Cl.
*G06F 16/951* (2019.01)
*G06Q 10/0639* (2023.01)
*G06N 5/01* (2023.01)
*G06F 16/9532* (2019.01)

(52) U.S. Cl.
CPC ........ *G06F 16/951* (2019.01); *G06F 16/9532* (2019.01); *G06N 5/01* (2023.01); *G06Q 10/06398* (2013.01)

(58) Field of Classification Search
CPC ............................ G06F 16/9532; G06F 16/951
See application file for complete search history.

(56) References Cited

U.S. PATENT DOCUMENTS

| 10,607,188 | B2 | 3/2020 | Kyllonen | |
| 2006/0294052 | A1* | 12/2006 | Kulkarni | G06F 16/951 707/999.001 |
| 2011/0196802 | A1* | 8/2011 | Ellis | G06F 16/334 707/723 |
| 2014/0317009 | A1* | 10/2014 | Bilodeau | G06Q 10/1053 705/321 |
| 2016/0196534 | A1* | 7/2016 | Jarrett | G06Q 50/2057 705/321 |
| 2017/0161366 | A1* | 6/2017 | Maitra | G06F 16/3344 |
| 2017/0213190 | A1* | 7/2017 | Hazan | G06F 16/951 |
| 2017/0344954 | A1* | 11/2017 | Xu | G06F 16/242 |
| 2018/0025303 | A1 | 1/2018 | Janz | |
| 2018/0130019 | A1* | 5/2018 | Kolb | G06F 16/24578 |
| 2021/0125149 | A1 | 4/2021 | Yu | |

FOREIGN PATENT DOCUMENTS

CN 112651714 A 4/2021

* cited by examiner

*Primary Examiner* — Kannan Shanmugasundaram
(74) *Attorney, Agent, or Firm* — CALDWELL INTELLECTUAL PROPERTY LAW

(57) ABSTRACT

In an aspect an apparatus for performance matching is presented. An apparatus includes at least a processor and a memory communicatively connected to the processor. A memory contains instructions configuring at least a processor to receive performance data of a user performing a skill evaluation. At least a processor is configured to determine a measured performance of a user as a function of performance data. At least a processor is configured to compare the measured performance to a performance parameter. At least a processor is configured to generate a search query as a function of a comparison. At least a processor is configured to provide a user with at least a posting as a function of a search query.

20 Claims, 7 Drawing Sheets

APPARATUS AND METHOD OF PERFORMANCE MATCHING

FIELD OF THE INVENTION

The present invention generally relates to the field of performance matching. In particular, the present invention is directed to an apparatus and methods of performance matching.

BACKGROUND

Modern posting matching is limited to pre-recorded data and fails to take into account any performance data.

SUMMARY OF THE DISCLOSURE

In an aspect an apparatus for performance matching is presented. An apparatus includes at least a processor and a memory communicatively connected to the processor. A memory contains instructions configuring at least a processor to receive performance data of a user performing a skill evaluation. At least a processor is configured to determine a measured performance of a user as a function of performance data. At least a processor is configured to compare the measured performance to a performance parameter. At least a processor is configured to generate a search query as a function of a comparison. At least a processor is configured to provide a user with at least a posting as a function of a search query.

In another aspect a method of performance matching using at least a processor is presented. A method includes receiving performance data of a user performing a skill evaluation. A method include measuring a performance of a user as a function of performance data. A method includes comparing a measured performance to a performance parameter. A method includes generating a search query as a function of a comparison. A method includes providing at least a posting to the user as a function of a search query.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for performance matching. In an embodiment, an apparatus may be configured to receive performance data from a user input. An apparatus may be configured to determine a measured performance of a user as a function of performance data. An apparatus may be configured to compare a measured performance to a performance parameter. An apparatus may be configured to generate a search query as a function of a comparison of a measured performance to a performance parameter. An apparatus may be configured to provide at least a posting to a user as a function of a search query.

Aspects of the present disclosure can be used to match performances of users to postings. Aspects of the present disclosure can also be used to generate user profiles as a function of a measured performance. Exemplary embodiments illustrating aspects of the present disclosure are described below in the context of several specific examples.

Figure 1:
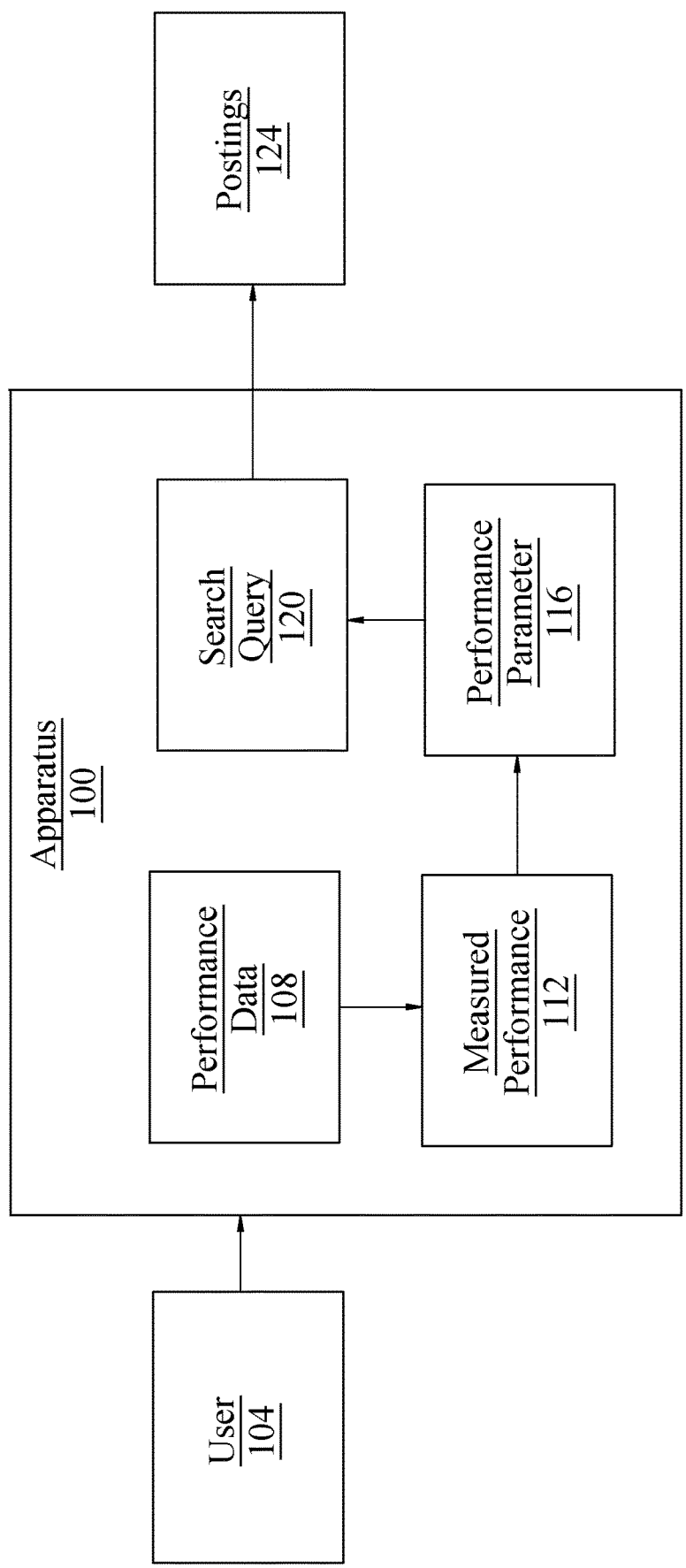
FIG. 1 is an exemplary embodiment of a block diagram of an apparatus for performance matching.

Referring now to FIG. 1, an exemplary embodiment of an apparatus 100 for performance matching is illustrated. Apparatus 100 may include a computing device. In some embodiments, apparatus 100 may include at least a processor. Apparatus 100 may include a memory communicatively connected to at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, a memory communicatively connected to at least a processor of apparatus 100 may contain instructions may configure the at least a processor of apparatus 100 to perform various tasks and/or processes. Apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or a computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to measure a performance of user 104 performing a skill evaluation. A "skill evaluation" as used in this disclosure is any assessment of one or more abilities of an entity. A skill evaluation may include, but is not limited to, tests, quizzes, interviews, and the like. In some embodiments, a skill evaluation may include, but is not limited to, video interviews, telephonic interviews, in-person interviews, and the like. As a non-limiting example, a skill evaluation may include a video interview for an entry-level software engineering position. In some cases, a skill evaluation may include content that is representative or communicative of an attribute of user 104. Apparatus 100 may measure performance data 108 from attributes of user 104 conveyed through a skill evaluation. Attributes may include, but are not limited to, subjects skills, competencies, credentials, talents, sociability, and the like. In some cases, attributes may be explicitly conveyed within a skill evaluation. Alternatively or additionally, in some cases, attributes may be conveyed implicitly in a skill evaluation.

With continued reference to FIG. 1, apparatus 100 may be configured to receive and/or determine performance data 108 through data extracted from audio and/or visual components of a skill evaluation. Apparatus 100 may determine an image component of a skill evaluation. As used in this disclosure, an "image component" is a visual representation. An image component may include animations, still imagery, recorded video, and the like. An image component may include visual information of a skill evaluation. In some cases, an image component may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like. In some cases, an image component may digitally represent (i.e., encode) visual information, for instance a pixel (luma and/or chroma) mapping.

With continued reference to FIG. 1, a skill evaluation may include an audio component. As used in this disclosure, an "audio component" is a representation of audio, for example a sound, a speech, and the like. In some cases, an audio component may be represented digitally. In some cases, an audio component may be temporally associated with an image component video. For example, in some cases, an audio component may be synchronized with an image component. An audio component may be compressed and/or encoded, for example by way of a digital audio coding format (i.e., codec). Exemplary audio codecs include without limitation free lossless audio codec (FLAC), MPEG-4 audio lossless coding, Dolby digital, MP3, Vorbis, and the like. In some cases, an audio codec may be lossless. Alternatively or additionally, in some cases, an audio codec may be lossy.

With continued reference to FIG. 1, a skill evaluation may include, for example by way of representation with one or both of an image component and audio component, verbal content. As used in this disclosure, "verbal content" is comprehensible language-based communication. For example, in some cases, verbal content may include visual verbal content. As used in this disclosure, "visual verbal content" is literal (e.g., written) verbal content. In some cases, visual verbal content may be included within a skill evaluation substantially by way of an image component. Alternatively or additionally, in some cases, verbal content may include audible verbal content. As used in this disclosure, "audible verbal content" is oral (e.g., spoken) verbal content. In some cases, audible verbal content may be included within a skill evaluation substantially by way of an audio component. In some cases, verbal content may be related to an attribute of user 104. For example, verbal content may explicitly communicative an attribute of user 104.

Still referring to FIG. 1, in some embodiments, a skill evaluation may include, for example by way of representation with one or both of an image component and audio component, non-verbal content. As used in this disclosure, "non-verbal content" is all communication that is not characterized as verbal content. As such, non-verbal content includes all subtle (and non-subtle) forms of communication which are not conveyed with use of language. Exemplary non-verbal content may include change in intonation and/or stress in a speakers voice, expression of emotion, interjection, and the like. For example, in some cases, non-verbal content may include visual non-verbal content. As used in this disclosure, "visual non-verbal content" is non-verbal content that is visually represented. In some cases, visual non-verbal content may be included within a skill evaluation substantially by way of an image component. Alternatively or additionally, in some cases, non-verbal content may include audible non-verbal content. As used in this disclosure, "visual non-verbal content" is non-verbal content that is audibly represented. In some cases, audible non-verbal content may be included in a skill evaluation substantially by way of an audio component. A skill evaluation may be representative of a form of a user-specific data. As used in this disclosure, "user-specific data" is any element of information that is associated with a specific user. Exemplary forms of user-specific data include an image component, audio component, verbal content, non-verbal content, solicitation video, as well as any information derived directly or indirectly from a skill evaluation or any other user-specific data. In some cases, user-specific may represent attributes associated with a specific user 104. In some cases, a non-verbal classifier may classify non-verbal content present in one or more audio components and/or image components to one or more of a posting, feature, keyword, and the like. A non-verbal classifier may include a number of classifiers, for example each being tasked with classifying a particular attribute or form of non-verbal content. For example, in some cases, a non-verbal classifier may classify a skill evaluation and related user 104 as associated with a feature or keyword representative of 'personable.' A non-verbal classifier may include a specialized audible non-verbal classifier to classify audible non-verbal content within an audio component as sounding 'personable' that is, for example, as having appropriate levels of intonation, timber, melody, stress, and the like. Likewise, a non-verbal classifier may include another specialized visual non-verbal classifier to classify visual non-verbal content as appearing 'personable' that is, for example, as having appropriate posture, facial expressions, manner of dress, and the like. In some cases, a classifier may include or a constituent part of tree structure, for making associations based upon a skill evaluation.

With continued reference to FIG. 1, apparatus 100 may transcribe a keyword. Apparatus 100 may transcribe a keyword as a function of one or more of image components and/or audio components. Apparatus 100 may transcribe a keyword as a function of verbal content. As used in this disclosure, a "keyword" is any meaningful word or syntax. In some cases, apparatus 100 may transcribe much or even substantially all verbal content from a skill evaluation. In some cases, apparatus 100 may transcribe audible verbal content, for example by way of speech to text or speech recognition technologies. Exemplary automatic speech recognition technologies include, without limitation, dynamic time warping (DTW)-based speech recognition, end-to-end automatic speech recognition, hidden Markov models, neural networks, including deep feedforward and recurrent neural networks, and the like. Generally, automatic speech recognition may include any machine-learning process described in this disclosure, for example with reference to FIG. 5.

Still referring to FIG. 1, in some embodiments, automatic speech recognition may require training (i.e., enrollment). In some cases, training an automatic speech recognition model may require an individual speaker to read text or isolated vocabulary. In some cases, a skill evaluation may include an audio component having audible verbal content, the contents of which are known a priori by apparatus 100. Apparatus 100 may then train an automatic speech recognition model according to training data which includes audible verbal content correlated to known content. In this way, apparatus 100 may analyze a person's specific voice and train an automatic speech recognition model to the person's speech, resulting in increased accuracy. Alternatively or additionally, in some cases, apparatus 100 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, apparatus 100 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include user 104. For example, user 104 may speak within a skill evaluation, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIG. 5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, apparatus 100 may recognize verbal content not only from speech (i.e., audible verbal content). For example, in some cases, audible verbal content recognition may be aided in analysis of an image component. For instance, in some cases, apparatus 100 may use image content to aid in recognition of audible verbal content as a viewing a speaker (e.g., lips) as they speak aids in comprehension of his or her speech. In some cases apparatus 100 may include audiovisual speech recognition processes.

Still referring to FIG. 1, in some embodiments, audio visual speech recognition (AVSR) may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel-frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by user 104, who is 'on camera.'

With continued reference to FIG. 1, in some embodiments, an image component may include or otherwise represent verbal content. For instance, written or visual verbal content may be included within an image component. In some cases, apparatus 100 may be configured to recognize a keyword as a function of visual verbal content. In some cases, recognizing a keyword may include optical character recognition.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes 140.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of an image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to an image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of an image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of an image component. Matrix matching may also rely on a stored glyph being in a similar font and at a same scale as input glyph. Matrix matching may work best with typewritten text.

Still referring to FIG. 1, in some embodiments, an OCR process may include a feature extraction process. As used in this disclosure, a "feature" is an individual measurable property or characteristic. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, an extracted feature may be compared with an abstract vector-like representation of a character, which might reduce to one or more glyph prototypes. General techniques of feature detection in computer vision are applicable to this type of OCR. In some embodiments, a machine-learning process, such as nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIG. 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, apparatus 100 may extract or otherwise recognize a feature. A feature may be recognized and/or extracted from an image component and/or audio component of a skill evaluation. In some cases, features may be recognized, which are associated with non-verbal content. For example, in some cases, visual non-verbal content such as expression of a subject's emotion may be represented by a number of features which are readily extracted from an image component of a skill evaluation. In some cases, recognition and/or extraction of features from image component may include use of machine vision techniques.

Still referring to FIG. 1, in some embodiments, apparatus 100 may include a machine vision process. A machine vision process may use an image component from a skill evaluation, to make a determination about verbal and/or non-verbal content. For example, in some cases a machine vision process may be used for world modeling or registration of objects within a space. In some cases, registration and/or a feature recognition may include image processing, such as without limitation object recognition, feature detection, edge/corner detection, and the like. Non-limiting examples of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

Still referring to FIG. 1, in some cases, a machine vision process may perform pose-estimation for example to ascertain a relative location or movement of objects within a skill evaluation. Pose-estimation may include one or more transformations, for example to a view of a frame (or an image of a skill evaluation) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect a multiple views of images of an object (from subsequent frames) to derive a relative position along a third (z) axis. In some cases, a skill evaluation may include a stereo image, having two stereoscopic views, which may be compared to derive z-axis values of points on object permitting, for instance, derivation of further z-axis points within and/or around the object using interpolation. Alternatively or additionally, relative movement within an image component (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view, including without user 104. In an embodiment, x and y axes may be chosen to span a plane common to a field of view of a camera used for a skill evaluation image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Figure 5:
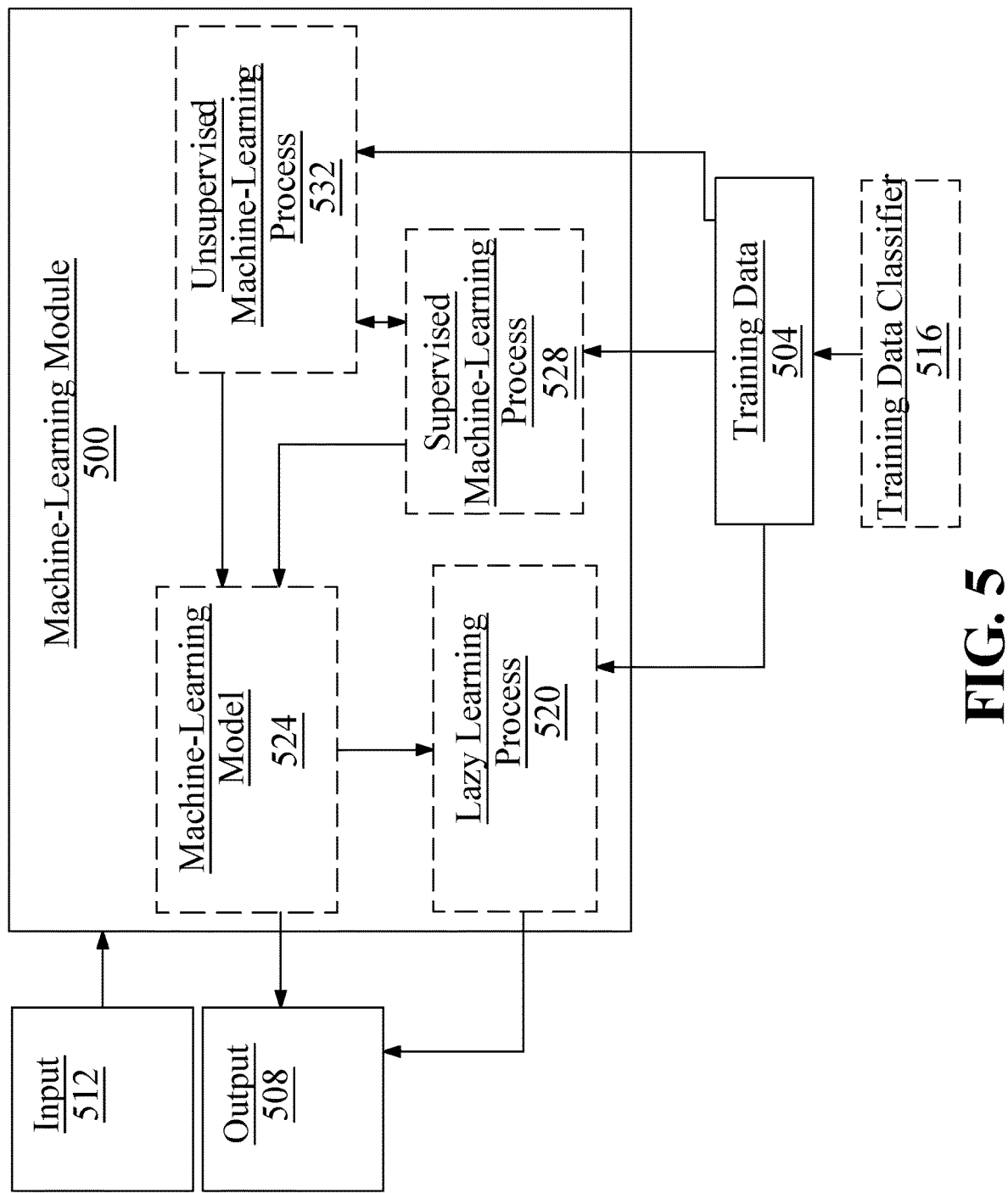
FIG. 5 is an exemplary embodiment of a machine learning model.

Still referring to FIG. 1, in some cases, a machine vision process may use a classifier, such as any classifier described throughout this disclosure, for example with reference to FIG. 5. A feature recognition may include any feature recognition processes described in this disclosure. In some cases, features may be representative of an attribute of user 104. Attributes which may be ascertained from features include manner of dress, environment around user 104, facial expression of user 104, tone of voice of user 104, and the like. Recognition and/or extraction of features may include pre- and/or post-procession. Pre- and/or post-processing may include any pre-processing and/or post-processing processes described in this disclosure. In some cases, a classifier may classify one or more of non-verbal content, image components, audio components, and features to a keyword.

Still referring to FIG. 1, keywords and/or features, in some cases, may be forms of user-specific data, that is they represent information associated with an individual user 104, for example attributes of user 104. In some cases, user-specific data, such as without limitation a video, image component, audio component, keywords, and/or features may be represented and/or processed as a signal. As used in this disclosure, a "signal" is any intelligible representation of data, for example used to convey data from one device to another. A signal may include an optical signal, a hydraulic signal, a pneumatic signal, a mechanical, signal, an electric signal, a digital signal, an analog signal and the like. In some cases, a signal may be used to communicate with apparatus 100, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), wavelet transform, finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, apparatus 100 may be configured to measure performance data 108 from user 104 performing a skill evaluation. Performance data 108 may be measured from a skill evaluation of user 104 through any data extraction processes as described above. "Performance data" as used in this disclosure is a metric pertaining to an evaluation of an entity. Performance data 108 may include vocal responses. Vocal responses may include, but are not limited to, answers to questions, tone of voice, inflection, annunciation, pronunciation, volume level, and the like. In some embodiments, performance data 108 may include a period of time between a prompt and a vocal response of user 104. In some embodiments, performance data 108 may include facial movements. Facial movements may include, but are not limited to, expressions, micro expressions, eye contact, and the like. In some embodiments, performance data 108 may include a length of a skill evaluation. A length of a skill evaluation may include, but is not limited to, an overall period of time of a duration of a skill evaluation. As a non-limiting example, a skill evaluation may last over two hours, which may indicate a favorable performance of user 104. As another non-limiting example, a skill evaluation may last only 45 minutes, which may indicate an unfavorable performance of user 104. In some embodiments, a shorter skill evaluation may indicate a favorable performance of user 104, such as if one or more participants of a skill evaluation deem user 104 to be a great fit for a posting in a quick time. In some embodiments, performance data 108 may include an engagement level of other participants of a skill evaluation. An engagement level may include a frequency and/or duration of interaction between user 104 and one or more other participants of a skill evaluation. Performance data 108 may include content of responses. Content of responses may include, but is not limited to, user information conveyed through a response, technical skill level of a response, and the like.

Still referring to FIG. 1, apparatus 100 may be configured to determine measured performance 112 as a function of performance data 108. A "measured performance" as used in this disclosure is a calculated evaluation of an entity. Measured performance 112 may include, but is not limited to, high evaluation, average evaluation, low evaluation, and the like. Measured performance 112 may include a scored performance, such as but not limited to, a value out of 5, a value out of 10, a value out of 100, and the like. In some embodiments, measured performance 112 may include one or more subcategories of performance, such as, but not limited to, social interactions, technical skill, participant engagement, and the like. As a non-limiting example, measured performance 112 may include a value of 3 out of 5 for social interaction, 4 out of 5 for technical skill, and 2 out of 5 for participant engagement. In some embodiments, apparatus 100 may compare performance data 108 to performance parameter 116 to determine measured performance 112. In other embodiments, apparatus 100 may compare measured performance 112 to performance parameter 116. A "performance parameter" as used in this disclosure is a criteria relating to a skill evaluation. Performance parameter 116 may include, but is not limited to, technical skills, sociability, response time, and the like. In some embodiments, performance parameter 116 may include an ideal response. An "ideal response" as used in this disclosure is a best answer to a prompt. As a non-limiting example, a prompt from a participant of a skill evaluation may ask a user "How long have you programmed in Swift?" to which an ideal response may be "I have been programming in Swift for five years". An ideal response may be generated by an ideal response machine learning model. An ideal response machine learning model may be trained with training data correlating skill evaluation prompts to ideal responses. Training data may be received through user input, external computing devices, and/or previous iterations of processing. An ideal response machine learning model may be configured to input skill evaluations and output ideal responses. Apparatus 100 may use an ideal response machine learning model to determine an ideal response of performance parameter 116.

In some embodiments, and still referring to FIG. 1, apparatus 100 may use an objective function to compare measured performance 112 to performance parameter 116. An "objective function" as used in this disclosure is a process of minimizing or maximizing one or more values based on a set of constraints. Apparatus 100 may generate an objective function to optimize a comparison of measured performance 112 to performance parameter 116. In some embodiments, an objective function of apparatus 100 may include an optimization criterion. An optimization criterion may include any description of a desired value or range of values for one or more attributes of a performance parameter; desired value or range of values may include a maximal or minimal value, a range between maximal or minimal values, or an instruction to maximize or minimize a performance parameter. As a non-limiting example, an optimization criterion may specify that a measured performance should be within an 8% difference of a performance parameter; an optimization criterion may cap a difference of a measured performance and a performance parameter, for instance specifying that a measured performance must not have a difference from a performance parameter greater than a specified value. An optimization criterion may specify one or more tolerances for differences in performance parameters. An optimization criterion may specify one or more desired performance criteria for a measured performance. In an embodiment, an optimization criterion may assign weights to different performance parameters or values associated with performances; weights, as used herein, may be multipliers or other scalar numbers reflecting a relative importance of a particular performance parameter or value. One or more weights may be expressions of value to a user of a particular outcome, performance value, or other facet of a matching process; value may be expressed, as a non-limiting example, in remunerative form, such as a quickest match, a strongest match, or the like. As a non-limiting example, minimization of differences of a measured performance and one or more performance parameters may be multiplied by a first weight, while tolerance above a certain value may be multiplied by a second weight. Optimization criteria may be combined in weighted or unweighted combinations into a function reflecting an overall outcome desired by a user; a function may be a performance function to be minimized and/or maximized. A function may be defined by reference to performance criteria constraints and/or weighted aggregation thereof as provided by apparatus 100; for instance, a performance parameter function combining optimization criteria may seek to minimize or maximize a function of performance parameter matching.

Still referring to FIG. 1, apparatus 100 may use an objective function to compare measured performance 112 to performance parameter 116. Generation of an objective function may include generation of a function to score and weight factors to achieve a performance score for each feasible pairing. In some embodiments, pairings may be scored in a matrix for optimization, where columns represent measured performances and rows represent performance parameters potentially paired therewith; each cell of such a matrix may represent a score of a pairing of the corresponding measured performance to the corresponding performance parameter. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each measured performance match and/or for each performance parameter. In such an example, optimization may determine the combination of measured performance matches such that each performance parameter pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all measured performances r, S is a set of all performance parameters s, $c_{rs}$ is a score of a pairing of a given measured performance with a given match, and $x_{rs}$ is 1 if a measured performance r is paired with a performance parameter s, and 0 otherwise. Continuing the example, constraints may specify that each measured performance is assigned to only one performance parameter, and each performance parameter is assigned only one measured performance. Measured performances and performance parameters may include measured performances and performance parameters as described above. Sets of performance parameters may be optimized for a maximum score combination of all generated performance parameters. In various embodiments, apparatus 100 may determine a combination of measured performances that maximizes a total score subject to a constraint that all measured performances are paired to exactly one performance parameter. Not all performance parameters may receive a measured performance pairing since each performance parameter may only produce one measured performance. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score performance parameters as described above, calculate an output of mathematical expression using the variables, and select a pairing that produces an output having the lowest size, according to a given definition of "size," of the set of outputs representing each of plurality of measured performance combinations; size may, for instance, included absolute value, numerical size, or the like. Selection of different loss functions may result in identification of different potential pairings as generating minimal outputs. Objectives represented in an objective function and/or loss function may include minimization of differences between performance parameters and measured performances. Objectives may include minimization of time in between responses of a measured performance. Objectives may include maximization of sociability scores of a measured performance.

Still referring to FIG. 1, apparatus 100 may use an objective function to compare measured performance 112 to performance parameter 116. As a non-limiting example, apparatus 100 may compare an engagement level of a participant of a skill evaluation of measured performance 112 to an ideal engagement level of a skill evaluation of a participant of performance parameter 116. In some embodiments, apparatus 100 may determine querying criteria for search query 120 as a function of a comparison of measured performance 112 to performance parameter 116. As a non-limiting example, a comparison of measured performance 112 to performance parameter 116 may indicate a low sociability and high technical knowledge of user 104. In some embodiments, an objective function may include measured performance 112 and/or performance parameter 116 as inputs, and output a score to maximize and/or minimize. Apparatus 100 may determine querying criteria to include low sociability and high technical knowledge. Apparatus 100 may generate search query 120 as a function of querying criteria determined from a comparison of measured performance 112 to performance parameter 116. In some embodiments, apparatus 100 may compare measured performance 112 to a pre-selected performance parameter 116 to determine an overall score of measured performance 112. In some embodiments, apparatus 100 may determine performance parameters 116 based on previous iterations of processing, other user performances, and the like. Performance parameter 116 may be tuned by a machine learning model, such as a machine learning model described in FIG. 7.

Still referring to FIG. 1, apparatus 100 may generate a user profile of user 104 as a function of measured performance 112. A "user profile" as used in this disclosure is an overall summary of an individual. A user profile may include attributes of user 104 which may be determined through measured performance 112. Attributes may include, but are not limited to, sociability, technical knowledge, work ethic, self-teaching skills, and the like. Apparatus 100 may update a user profile as a function of iterations of measured performances 112. Apparatus 100 may generate search query 120 as a function of a user profile, which may seek to match user profile data of a user profile to posting descriptions of postings 124. In some embodiments, apparatus 100 may compare a user profile to other user profiles of users performing similar skill evaluations for similar postings 124. In some embodiments, apparatus 100 may generate a user profile as a function of a user profile machine learning model. A user profile machine learning model may be trained with training data correlating measured performances to user profiles. Training data may be received from user input, external computing devices, and/or previous iterations of processing. A user profile machine learning model may be configured to input measured performances 112 and output user profiles. In some embodiments, apparatus 100 may categorize and/or classify elements of performance data 108, measured performance 12, and/or a user profile. For instance and without limitation, apparatus 100 may classify elements of performance data 108 to groups and/or subgroups such as social skills, engagement levels, technical knowledge, and the like. Apparatus 100 may use any classifier and/or categorizing process as described in this disclosure.

Still referring to FIG. 1, in some embodiments, apparatus 100 may generate search query 120. A "search query" as used in this disclosure is a function that retrieves data based on a criteria. In some cases, apparatus 100 may associate user 104 with a posting 124 by performing a text retrieval process as a function of a keyword through search query 120. In some embodiments, text searching may include querying, such as generating search query 120. In some cases, search query 120 may include any number of querying tools, including without limitation keywords (as described above), field-restricted search, Boolean queries, phrase search, concept search, concordance search, proximity search, regular expression, fuzzy search, wildcard search, and the like. In some cases, keywords may be used to perform a query. In some cases, a document creator (or trained indexers) may supply a list of words that describe subject of the document, including without limitation synonyms of words that describe the subject. In some cases, keywords may improve recall, for instance if the keyword list includes a keyword that is not in text of a document. In some cases, querying tools may include field-restricted search. A field-restricted search may allow a queries scope to be limited to within a particular field within a stored data record, such as "Title" or "Author." In some cases, a query tool may include Boolean queries. Searches that use Boolean operators (for example, "encyclopedia" AND "online"

NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta". This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

Still referring to FIG. 1, apparatus 100 may generate search query 120 as a function of measured performance 112 and/or performance parameter 116. Search query 120 may search through the Internet for semantic elements matching measured performance 112 and/or performance parameter 116. Search query 120 may search through a posting database. A "posting database" as used in this disclosure is a collection of data pertaining to career openings. Career openings may include, but are not limited to, advertisements, employer postings, unannounced positions, and the like. Search query 120 may include querying criteria. "Querying criteria" as used in this disclosure are parameters that constrain a search. Querying criteria may include a similarity of measured performance 112 and/or performance parameter 116 to a posting 124 of a posting database. A similarity may be determined by a clustering algorithm, optimization model, and the like. Querying criteria may be tuned by a machine learning model, such as a machine learning model described below in FIG. 7.

Still referring to FIG. 1, generating search query 120 may include generating a web crawler function. Search query 120 may be configured to search for one or more keywords, key phrases, and the like. A keyword may be used by search query 120 to filter potential results from a query. As a non-limiting example, a keyword may include "remote". Search query 120 may be configured to generate one or more key words and/or phrases as a function of performance parameter 116 and/or measured performance 112. Search query 120 may give a weight to one or more query criteria. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. In some embodiments, query 116 may be configured to filter out one or more "stop words" that may not convey meaning, such as "of," "a," "an," "the," or the like.

With continued reference to FIG. 1, in some embodiments, search query 120 may be performed with a test search, for example using a keyword as a search term. A text search may include techniques for searching a single computer-stored document or a collection of documents, for example in a database. A text search may include full-text search. Full-text search may be distinguished from searches based on metadata or on field-based searching (e.g., fields such as titles, abstracts, selected sections, or bibliographical references). In an exemplary full-text search, apparatus 100 may examine all words in every stored document as apparatus 100 tries to match search criteria (for example, keywords). Alternatively, a text search may be limited to fields, such as with field-based searching.

Still referring to FIG. 1, apparatus 100 may generate search query 120 to query postings 124 for presence of a keyword. Querying postings 124 may include one or more of word searching, phrase searching, proximity searching, full-text searching, field (or metadata) searching, and the like. In some cases, each posting 124 may include a posting keyword. As used in this disclosure, a "posting keyword" is a word that is of particular relevance to an opportunity listing description. In some cases, associating user 104 with posting 124 may include comparing a keyword from a skill evaluation with a posting 124 keyword.

Still referring to FIG. 1, apparatus 100 may generate search query 120 to find a better fit of a posting 124 for user 104 based on measured performance 112 and/or performance data 108 determined from a skill evaluation of user 104. A better fit may include a posting 124 that more closely matches favorable attributes of user 104, which may be determined by measured performance 112. As a non-limiting example, measured performance 112 may indicate user 104 performed well in a skill evaluation socially, but may have lacked technical knowledge. Search query 120 may filter through a posting database to find a posting 124 that requires high sociability and lower technical knowledge. In some embodiments, search query 120 may associate user 104 with one or more postings 124. In some cases association of user 104 with postings 124 may include one or more of a machine-learning process and/or a classifier. A machine-learning process may include any machine-learning process described in this disclosure, for example with reference to FIG. 7. A classifier may include any classifier described in this disclosure, for example with reference to FIG. 7. In some cases, apparatus 100 may associate use 104 with posting 124 as a function of measured performance 112. As described above, measured performance 112 may represent non-verbal content from a skill evaluation. Measured performance 112 may be correlated to postings 124, for example by way of one or more models (e.g., machine-learning models). In some cases, apparatus 100 may associate user 104 with one or more postings 124 by correlating, matching, or otherwise comparing user-specific data with description-specific data. In some cases, one or both of user-specific data and description-specific data may be at least partially represented by features which are inputs and/or outputs of machine-learning processes. For example, a machine-learning model may be trained with deterministic or historical subject-specific data correlated to description-specific data. For example, posting descriptions (previously filled) may be correlated with user-specific data associated with employees who filled the posting description, and optionally a measure of their success in the role (e.g., years in position, reason for leaving, and the like).

With continued reference to FIG. 1, apparatus 100 may associate user 104 with a posting description of postings 124. A "posting," as used in this disclosure, is a communication of a job position for which a prospective employer is seeking or may be seeking one or more candidates to potentially fill the job position. Apparatus 100 may search one or more databases for postings 124. A posting may include information about the employer such as the employer's name and address; compensation such as a salary, an hourly wage, and/or benefits; a title of the job position; geographical location of where the job will be performed and/or whether the job is to be performed remotely; a description of the job position such as a listing of responsibilities, expectations, and/or goals to be accomplished; criteria; and/or the like. A job position may be part-time and/or full-time. A job position may be as an employee and/or contractor. As used in this disclosure, "criteria," are skills, accreditations, a minimum grade point average (GPA), degree, major and/or focus of study, and/or experience. Criteria may include requirements and/or preferences. As used in this disclosure, a "requirement" is a criterion that must be satisfied for a prospective employee to be eligible for consideration for a posting. As used in this disclosure, a "preference" is a desired criterion, but it is not required for a prospective employee to be considered for a posting. As used in this disclosure, a "posting description" is a representation of a function; a person may be required to perform, oversee, or be involved with the function. In some cases, a posting description may include a number of fields, for example a unique identifier, a title, required attributes, desired attributes, explanation of role, explanation of benefits, location of job, organization (e.g., company) associated with the posting description, and the like. In some cases, a posting description may be represented by description-specific data. As used in this disclosure, "description-specific data" is information associated with a specific posting description. In some cases, description-specific data may include information of a posting description as well as any information derived directly or indirectly from the posting description. In some cases, description-specific data may be generated through analysis and/or pre-processing of a posting description.

With continued reference to FIG. 1, apparatus 100 may associate user 104 with at least a posting description, for example as a function of user-specific data (e.g., one or more of a keyword and a feature). In some cases, associating user 104 with a posting description may include use of user-specific data and description-specific data. For example, in some cases, associating user 104 with a posting description may include a text retrieval process comparing subject-specific data with description-specific data. Document retrieval may include matching of some query against a set of records, for instance text-based records. In some cases, records could be any type of structured or unstructured text, such as job descriptions. In some cases, document retrieval may be referred to as, or as a branch of, text retrieval. "Text retrieval," as used in this disclosure, is information retrieval where the information has a text component.

Still referring to FIG. 1, in some embodiments, associating user 104 with postings 124 may additionally include classifying, using at least a candidate classifier, user 104 to postings 124. As used in this disclosure, a "candidate classifier" is a classifier that classifies user 104 to postings 124 or vice versa. A candidate classifier may include any classifier described in this disclosure, including with reference to FIG. 7. In some cases, a candidate classifier may include a trained machine-learning model, which is trained using candidate training data. As used in this disclosure, "candidate training data" is a training data that correlates one or more of users 104, user-specific data, and user attributes, to one or more of postings 124, description-specific data, and posting description data. As used in this disclosure, a "posting description data" is an element of information associated with a posting 124 description. In some cases, candidate training data may include deterministic and/or historical data. For example, candidate training data may include user-specific data for a number of users who successfully fill positions correlated with description-specific data related to posting 124 descriptions for the successfully filled positions. In some cases, a measure of success may be quantitative, for example number of years working in a position, advancement from position, positive compensation changes (e.g., raises), and the like. Alternatively or additionally, in some cases, a measure of success may be qualitative, for example a survey from a supervisor, a self-assessment and the like.

Still referring to FIG. 1, in some embodiments, apparatus 100 may be further configured to determine a relevance as a function of association between user 104 and posting 124. As used in this disclosure, "relevance" is a measure of closeness of association, for example between user 104 and a posting 124. In some cases, relevance may be determined by one or more processes for associating user 104 with a posting 124. For example, in some cases, a candidate classifier may output a confidence metric that is indicate of confidence associated with a classification of a user 104 to a posting 124. In some cases, confidence metric may be a measure of relevance. In some cases relevance may be a quantified metric, for example in arbitrary units or relative units (e.g., percent). In some cases, a candidate classifier may use a distance-based classification algorithm (e.g., k nearest neighbor, vector similarity, and the like). Where a distance-based classification algorithm is used, distance may be used directly or indirectly as a confidence metric.

Still referring to FIG. 1, in some embodiments, search query 120 may include an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input semantic elements and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, apparatus 100 may be configured to generate query 116 based on a freshness and/or age of a query result. A freshness may include an accuracy of a query result. An age may include a metric of how outdated a query result may be. In some embodiments, a computing device may generate a web crawler configured to search the Internet for opportunity listings, such as, but not limited to, job postings and the like. As a non-limiting example, search query 120 may include a web crawler configured to search and/or index information of words and/or phrases of postings 124 having a similarity to performance parameters 116 and/or measured performances 112.

Still referring to FIG. 1, apparatus 100 and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of semantic data such as characters, symbols, phrases, text strings, and one or more correlated similar semantic elements of an opportunity listing, where similar semantic elements of an opportunity listing and associated semantic data may be identified using feature learning algorithms as described below. Index training data and/or elements thereof may be added to, as a non-limiting example, by classification of multiple users' semantic data to similar semantic data of opportunity listings using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as $P(A/B)=P(B/A) P(A)÷P(B)$, where $P(AB)$ is the probability of hypothesis A given data B also known as posterior probability; $P(B/A)$ is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. Apparatus 100 may then calculate a likelihood table by calculating probabilities of different data entries and classification labels. Apparatus 100 may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a media item, such as spoken or written text, objects depicted in images, metadata, or the like, to clusters representing themes.

In an embodiment, and still referring to FIG. 1, apparatus 100, and/or a device generating an index classifier, may generate new similar semantic element functions using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of semantic data, as defined above, with each other. As a non-limiting example, a feature learning algorithm may detect co-occurrences of similar semantic elements, as defined above, with each other. Apparatus 100 may perform a feature learning algorithm by dividing semantic data from a given source into various sub-combinations of such data to create similar semantic data sets as described above, and evaluate which similar semantic data sets tend to co-occur with which other similar semantic data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of semantic elements with multiple similar semantic elements, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified semantic elements and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related semantic element data, which may be provided with similar semantic element data; this may, for instance, generate an initial set of similar semantic element data from an initial set of semantic element data of a large number of users, and may also, upon subsequent iterations, identify new clusters to be provided new similar semantic element data, to which additional semantic element data may be classified, or to which previously used semantic element data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \notin C}\, \mathrm{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma\, x_i \notin S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected semantic element set. Degree of similarity index value may indicate how close a particular combination of semantic element data, similar semantic element data and/or semantic data of opportunity listings is to being classified by k-means algorithm to a particular cluster. K-means clustering algorithm may evaluate the distances of the combination of similar semantic element data to the k-number of clusters output by k-means clustering algorithm. Short distances between a set of semantic element data and a cluster may indicate a higher degree of similarity between the set of semantic element data and a particular cluster. Longer distances between a set of semantic element data and a cluster may indicate a lower degree of similarity between a semantic element data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a semantic element data set and the data entry cluster. Alternatively or additionally k-means clustering algorithm may select a plurality of clusters having low degree of similarity index values to semantic element data sets, indicative of greater degrees of similarity. Degree of similarity index values may be compared to a threshold number indicating a minimal degree of relatedness suitable for inclusion of a set of semantic element data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 1, apparatus 100 may be configured to generate an index classifier using thematic training data including a plurality of media items and a plurality of correlated themes. As used herein, a "media item" is an element of content transmitted over a network such as the Internet to be displayed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop under" advertisement, an advertisement that displays in a layer such as a layer in front of a web page, a redirect advertisement, a "splash screen" advertisement, or the like. A media item may include a "meme," a video forwarded between and/or from social media users, and/or platforms, or the like. A media item may include metadata such as owner, producer, time or place of creation, or the like A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include a main character, subject matter, place, event, or other main focus of the video, story, or meme.

Still referring to FIG. 1, media training data may be populated by receiving a plurality of user inputs, for instance via graphical user interface forms; as a non-limiting example, each such form may present to a user at least a media item and a user may select a label for each such media item from a list of labels provided to the user and/or may enter one or more words in a text entry element, which may be mapped to labels using language processing as described below; label selected by user may correspond to a user-entered identification of a principal theme of the media item. An index classifier may input media items and output principal themes of the media items.

Continuing to refer to FIG. 1, apparatus 100 may be configured to generate an index classifier using a classification algorithm, which may be implemented, without limitation, using any classification algorithm suitable for generating a vice classifier as described above. As a non-limiting example, an index classifier may use a K-nearest neighbors algorithm that may be configured to classify an input vector including a plurality of attributes of a media item, such as spoken or written text, objects depicted in images, metadata, etc., to clusters representing themes. An index classifier may alternatively or additionally be created using a naïve-Bayes classification algorithm as described above. An index classifier may enable a computing device to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

In an embodiment, and continuing to refer to FIG. 1, apparatus 100 may modify media training data, for instance to replace a media item with plurality of objects; plurality of objects may be used as attributes of a vector associated with a media item in media training data, for instance for use in KNN or other classification algorithms as described above. Objects of plurality of objects may include, without limitation, objects depicted in images or frames of media, objects described in textual data extracted from images or text, and/or converted from spoken words in media, or the like. In an embodiment, a computing device may be configured to extract, from each media item, a plurality of content elements, such as without limitation geometric forms extracted from images and/or video frames, words or phrases of textual data, or the like. A computing device may be configured to classify each content element of the plurality of content elements to an object of a plurality of objects using an object classifier, where the object classifier may be generated using any classification algorithm as described above. An object classifier may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the media item, which may, as a non-limiting example, cause an index classifier to classify the media item to a theme consistent with a higher prevalence of a given object; prevalence and/or relative frequency of an object in media item may also be used, as described below, to determine a degree to which the object is presented in the media item for additional processing. In an embodiment, a computing device may replace media item with a plurality of objects as described above in media training data; for instance, a separate instance of media training data in which media items are replaced with plurality of objects may be generated, permitting use thereof in place of the original media training data. Where object classifier is updated, for instance by adding to a list of objects corresponding to clusters and rerunning object classifier to classify to the updated list, media items stored in memory may be subjected to object classifier again to update each plurality of objects; each of these actions, including without limitation rerunning object classifier to classify to the updated list and/or updating plurality of objects, may be performed by a computing device. An index classifier may likewise be updated by rerunning classification algorithms on updated media training data.

Still referring to FIG. 1, an object classifier and/or classifiers may be run against one or more sets of object training data, where object training data may include any form of object training data as described above. Object training data may include, without limitation, a plurality of data entries, each data entry including one or more content elements and one or more objects represented thereby. Object training data and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

With continued reference to FIG. 1, apparatus 100 may be configured to classify geometric forms identified in images and/or video frames to objects using a visual object classifier; that is, an object classifier may include a visual object classifier. A visual object classifier may include any classifier described above; a visual object classifier may generate an output classifying a geometric form in a photograph to an object according to any classification algorithm as described above. In an embodiment, a computing device may train a visual object classifier using an image classification training set, which may, as a non-limiting example, include geometric forms extracted from photographs and identifications of one or more objects associated therewith. Image classification training set may, for instance, be populated by user entries of photographs, other images of objects, and/or geometric representations along with corresponding user entries identifying and/labeling objects as described above. A computing device may identify objects in the form of geometrical figures in the photographs as described above, and create training data entries in a visual object classifier training set with the photographs and correlated objects; in an embodiment, correlations may be further identified by matching locations of objects in a coordinate system mapped onto images to locations of geometric objects in a photograph, by receiving user identifications or "tags" of particular objects, or the like. A computing device may be configured to extract the plurality of content elements by extracting a plurality of geometric forms from a visual component of the media item and classify the plurality of geometric forms using the visual object classifier.

Still referring to FIG. 1, apparatus 100 may be configured to classify textual elements to objects using a linguistic object classifier; that is, an object classifier may include a linguistic object classifier. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like.

Still referring to FIG. 1, a linguistic object classifier may include any classifier described above; a linguistic object classifier may generate an output classifying an element of textual data to an object according to any classification algorithm as described above. In an embodiment, a computing device may train a linguistic object classifier using a linguistic classification training set, which may, as a non-limiting example, include elements of textual data and identifications of one or more objects associated therewith. Linguistic classification training set may, for instance, be populated by user entries of textual data along with corresponding user entries identifying and/labeling objects as described above. A computing device may be configured to extract the plurality of content elements by extracting a plurality of textual elements from a verbal component of the media item and classify the plurality of textual elements using a linguistic object classifier.

Still referring to FIG. 1, generation of linguistic classification training set, mapping of user entries to object labels, and/or classification of textual objects to labels may alternatively or additionally be performed using a language processing algorithm. A language processing algorithm may operate to produce a language processing model. A language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 1, a language processing algorithm may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between at least a word and/or phrase and an object label and/or an additional word. There may be a finite number of labels, words and/or phrases, and/or relationships therebetween; an HMM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing algorithm may use a corpus of documents to generate associations between language elements in a language processing algorithm, and a computing device may then use such associations to analyze words extracted from one or more documents and determine that the one or more documents indicate a given relationship between at least a word and/or phrase and an object label and/or an additional word. In an embodiment, a computing device may perform an analysis using a selected set of significant documents, such as documents identified by one or more users and/or expert users, and/or a generalized body of documents and/or co-occurrence data, which may be compiled by one or more third parties. Documents and/or co-occurrence data may be received by a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, a computing device may automatically obtain the documents, co-occurrence data, or the like by downloading and/or navigating to one or more centralized and/or distributed collections thereof. A computing device may alternatively or additionally receive any language processing model from one or more remote devices or third-party devices and utilize such language processing model as described above.

Still referring to FIG. 1, a computing device may detect and/or intercept media using one or more programs and/or modules that can act to detect and/or redirect content that is being transmitted to a user device; such programs and/or modules may include, without limitation, web browsers provided to a user device, "plugins" or the like operating on web browsers on a user device, programs and/or modules installed at advertisement providers, content providers, social media platforms or the like, and/or programs that route network traffic through one or more servers operated by a computing device as a portal for network access for human subject's device. Persons skilled in the art, upon reviewing the entirety of this disclosure, will be aware of various additional or alternative ways in which a computing device may receive and/or detect media items within the scope of this disclosure.

With continued reference to FIG. 1, a computing device may be configured to identify a principal theme of a received media item using a media theme classifier. A computing device may input a media item to a media theme classifier, which may output a principal theme, for instance by identifying a cluster, corresponding to a theme, which is most closely associated with a media item, as described above. In an embodiment, a computing device may input a plurality of objects identified in the media item to a media theme classifier. For instance, and without limitation, a computing device may extract a plurality of content elements from a media item, where extraction may be performed in any manner described above. A computing device may classify each content element of plurality of content elements to an object of a plurality of objects using an object classifier, which may be any object classifier or collection of object classifiers as described above. A computing device may input plurality of objects to a media theme classifier.

Still referring to FIG. 1, apparatus 100 may present a ranked list of postings 124 to a user. A ranking may be determined as a function of an optimization model, ranking process, heuristics, and the like. Ranking postings 124 may include comparing postings 124 to a ranking criteria. A "ranking criteria" as used in this disclosure is an attribute by which a hierarchy is determined. Ranking criteria may include, but is not limited to, performance parameter similarities, user attributes, and the like.

Still referring to FIG. 1, apparatus 100 may provide a skill evaluation improvement recommendation to user 104. A "skill evaluation improvement recommendation" as used in this disclosure is a suggestion for a user to increase performance during a skill evaluation. Apparatus 100 may determine a skill evaluation improvement recommendation as a function of measured performance 112 and/or performance parameter 116. For instance and without limitation, apparatus 100 may determine user 104 lacked eye contact during a skill evaluation. Apparatus 100 may provide user 104 with a skill evaluation improvement recommendation of increasing eye contact with a participant of a skill evaluation. Additionally and/or alternatively, apparatus 100 may provide a skill evaluation improvement recommendation based on, but not limited to, posting data, skill evaluation data and/or participant data. Apparatus 100 may use an improvement recommendation machine learning model to provide a skill evaluation improvement recommendation. An improvement recommendation machine learning model may be trained with training data correlating measured performances to skill evaluation improvement recommendations. Training data may be received from user input, external computing devices, and/or previous iterations of processing. In some embodiments, apparatus 100 may preemptively provide a skill evaluation improvement recommendation based on an upcoming skill evaluation related to posting 124. For instance and without limitation, apparatus 100 may determine that user 104 should wear formal clothing and communicate in a sophisticated manner for a skill evaluation with a partner of a law firm.

Figure 2:
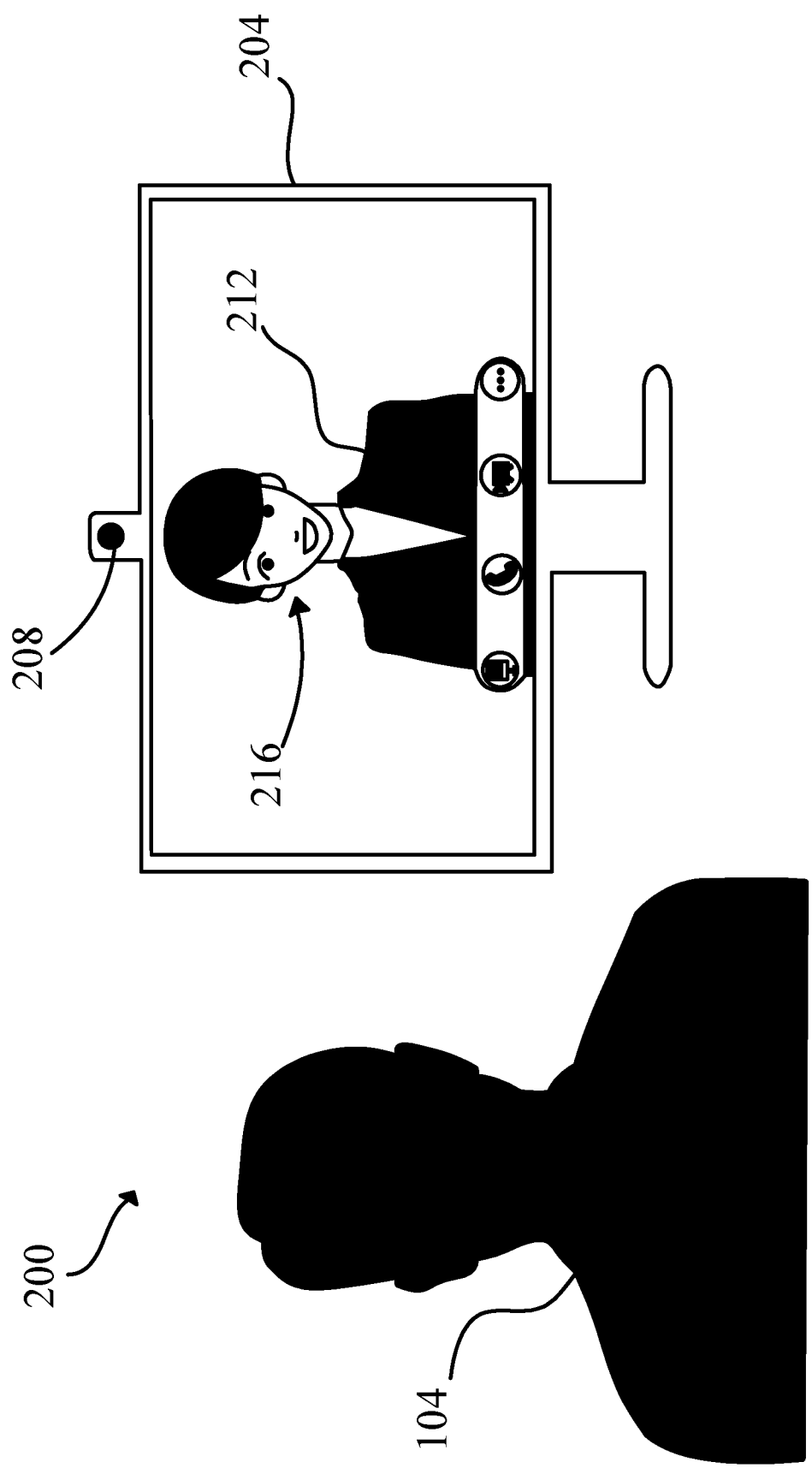
FIG. 2 is an exemplary embodiment of a skill evaluation.

Referring now to FIG. 2, an exemplary embodiment of a skill evaluation 200 is presented. Skill evaluation 200 may include user 104. In some embodiments, skill evaluation may include display 204. Display 204 may include video sensor 208. A video sensor may be configured to detect optical and audible data. Skill evaluation 200 may include participant 212. A participant may include, but is not limited to, an interviewer for a posting. Apparatus 100 may measure interactions between user 104 and participant 212 in skill evaluation 200 as described above with reference to FIG. 1. Apparatus 100 may measure engagement 216 of participant 212. Engagement 216 may include, but is not limited to, facial expressions, micro expressions, hand movements, body language, eye movements, mouth movements, and the like. For instance and without limitation, engagement 216 may indicate a high engagement level of participant 212, such as but not limited to good eye contact, smiling, friendly disposition, frequent mouth movements such as for speaking, and the like. In another non-limiting example, engagement 216 may indicate a low engagement level of participant 212, such as but not limited to, neutral and/or negative facial expressions, lack of eye contact, low mouth movement frequency, cold body language, and the like. In some embodiments, apparatus 100 may determine an engagement of user 104, which may include engagement data as described above with reference to engagement 216. Apparatus 100 may use engagement 216 to determined performance data 108, measured performance 112, and the like. Apparatus 100 may continuously update performance data 108 and measured performance 112 as a function of a live measurement of engagement 216 and/or an engagement of user 104. In some embodiments, apparatus 100 may use an engagement machine learning model to determine an engagement level. An engagement machine learning model may be trained with training data correlating engagements to engagement levels. Training data may be received from user input, external computing devices, and/or previous iterations of processing. An engagement level machine learning model may be configured to input engagements and output engagement levels. A machine learning model may be as described below with reference to FIG. 6.

Figure 3:
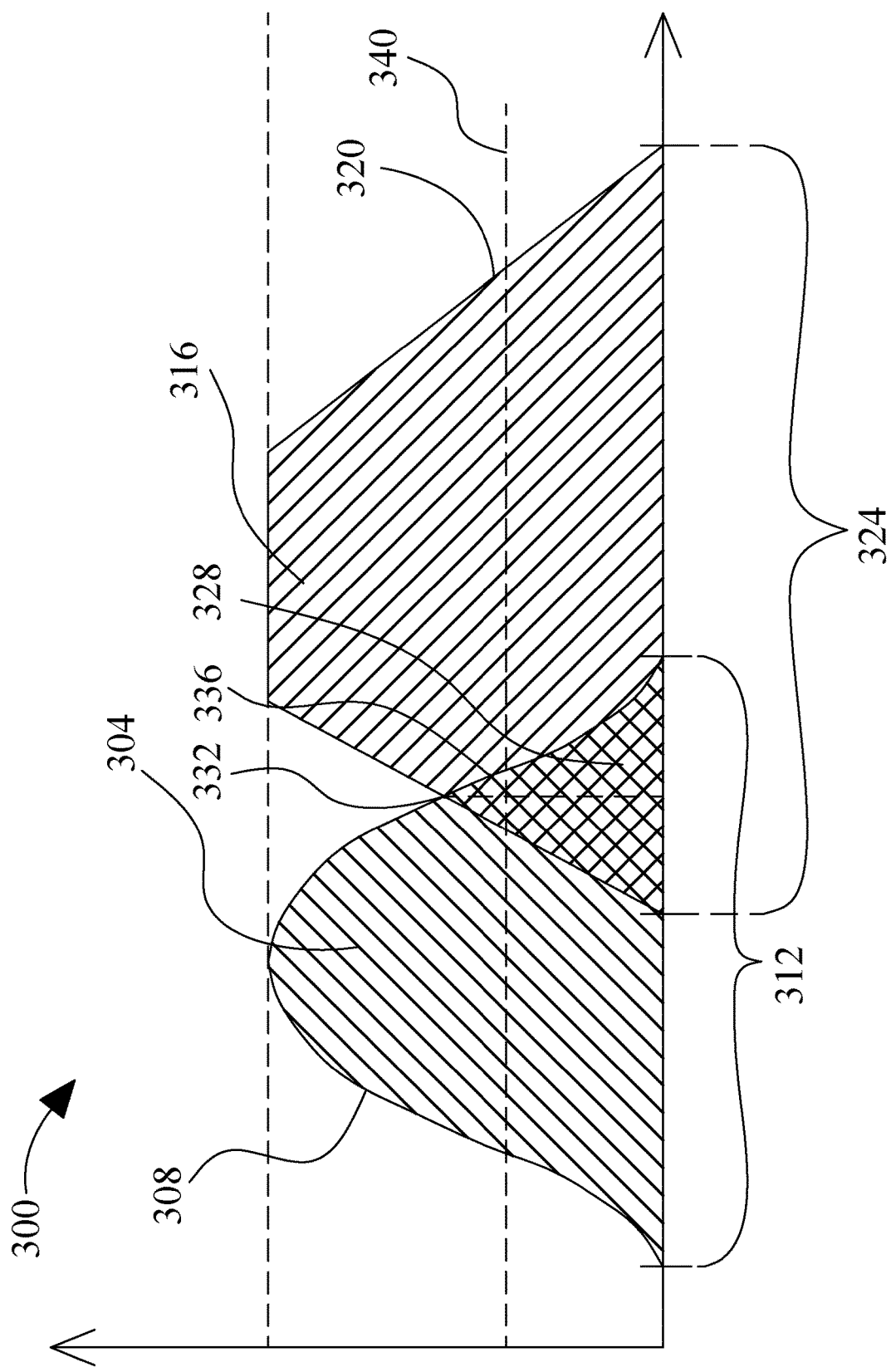
FIG. 3 is an exemplary embodiment of a block diagram of a fuzzy logic system.

Referring now to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between measured performance 112 and posting 124 descriptions for combination to occur as described above. There may be multiple thresholds; for instance, a second threshold may indicate a sufficient match for purposes of a direct-match subset as described in this disclosure. Each threshold may be established by one or more user inputs. Alternatively or additionally, each threshold may be tuned by a machine-learning and/or statistical process, for instance and without limitation as described in further detail below.

Still referring to FIG. 3, in an embodiment, a degree of match between fuzzy sets may be used to rank one performance parameter against another. For instance, if two performance parameters have fuzzy sets matching a probabilistic outcome fuzzy set by having a degree of overlap exceeding a threshold, apparatus 100 may further rank the two performance parameters by ranking a performance parameter having a higher degree of match more highly than a performance parameter having a lower degree of match. Where multiple fuzzy matches are performed, degrees of match for each respective fuzzy set may be computed and aggregated through, for instance, addition, averaging, or the like, to determine an overall degree of match, which may be used to rank performance parameters; selection between two or more matching performance parameters may be performed by selection of a highest-ranking performance parameter, and/or multiple predictive prevalence values may be presented to a user in order of ranking. In some embodiments, a fuzzy inferencing system may be used to generate a measured performance parameter. A fuzzy inferencing system may determine if a first performance parameter overlaps a first measured parameter set, and a second performance parameter overlaps a second measured parameter set, then the second performance parameter overlaps the first performance parameter. A fuzzy inferencing system may defuzzify overlapping sets to output a result of overlapping sets, such as, and without limitation, a match of data between two or more fuzzy sets.

Further referring to FIG. 3, in an embodiment, a degree of match between fuzzy sets may be used to classify a measured performance with a performance parameter. For instance, if a measured performance has a fuzzy set matching a performance parameter fuzzy set by having a degree of overlap exceeding a threshold, apparatus 100 may classify the measured performance as belonging to the performance parameter. Where multiple fuzzy matches are performed, degrees of match for each respective fuzzy set may be computed and aggregated through, for instance, addition, averaging, or the like, to determine an overall degree of match.

Still referring to FIG. 3, in an embodiment, a measured performance may be compared to multiple performance parameter fuzzy sets. For instance, a measured performance may be represented by a fuzzy set that is compared to each of the multiple performance parameter fuzzy sets; and a degree of overlap exceeding a threshold between the measured performance fuzzy set and any of the multiple performance parameter fuzzy sets may cause apparatus 100 to classify the measured performance as belonging to a performance parameter For instance, in one embodiment there may be two performance parameter fuzzy sets, representing respectively engagement levels and technical knowledge. First performance parameter may have a first fuzzy set; Second performance parameter may have a second fuzzy set; and a measured performance may have a measured performance fuzzy set. Apparatus 100, for example, may compare a measured performance fuzzy set with each of first performance parameter fuzzy set and second performance parameter fuzzy set, as described above, and classify a measured performance to either, both, or neither of first performance parameter fuzzy set or second performance parameter fuzzy set. Machine-learning methods as described throughout may, in a non-limiting example, generate coefficients used in fuzzy set equations as described above, such as without limitation x, c, and σ of a Gaussian set as described above, as outputs of machine-learning methods. Likewise, a measured performance may be used indirectly to determine a fuzzy set, as a measured performance fuzzy set may be derived from outputs of one or more machine-learning models that take the measured performance directly or indirectly as inputs.

Still referring to FIG. 3, a computing device of apparatus 100 may use a logic comparison program, such as, but not limited to, a fuzzy logic model to determine a performance score. A performance score may include, but is not limited to, amateur, average, excellent, superior, and the like; each such performance score may be represented as a value for a linguistic variable representing performance scores or in other words a fuzzy set as described above that corresponds to a degree of capability, competence, technical skill, speaking skill, and the like, as calculated using any statistical, machine-learning, or other method that may occur to a person skilled in the art upon reviewing the entirety of this disclosure. In other words, a given element of a measured performance may have a first non-zero value for membership in a first linguistic variable value such as "5," and a second non-zero value for membership in a second linguistic variable value such as "10" In some embodiments, determining a performance score may include using a linear regression model. A linear regression model may include a machine learning model. A linear regression model may be configured to map data of measured performances such as engagement levels, technical knowledge, and the like [input elements of %%%], to one or more performance scores. A linear regression model may be trained using training data correlating measured performance data to performance scores.]. A linear regression model may map statistics such as, but not limited to, average user scores, areas of strength of a performance, areas of weakness of a performance, common skill evaluation engagements, and the like. In some embodiments, determining a performance score of a measured performance may include using a performance score classification model. A performance score classification model may be configured to input collected data and cluster data to a centroid based on, but not limited to, frequency of appearance, linguistic indicators of performances, and the like. Centroids may include scores assigned to them such that elements of a measured performance may each be assigned a score. In some embodiments, a performance score classification model may include a K-means clustering model. In some embodiments, a performance score classification model may include a particle swarm optimization model. In some embodiments, determining a performance score of a measured performance may include using a fuzzy inference engine. A fuzzy inference engine may be configured to map one or more measured performance data elements using fuzzy logic. In some embodiments, a plurality of entity assessment devices may be arranged by a logic comparison program into performance score arrangements. A "performance score arrangement" as used in this disclosure is any grouping of objects and/or data based on skill level and/or output score. This step may be implemented as described above in FIGS. 1-2. Membership function coefficients and/or constants as described above may be tuned according to classification and/or clustering algorithms. For instance, and without limitation, a clustering algorithm may determine a Gaussian or other distribution of questions about a centroid corresponding to a given performance level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to a measured performance, such as a degree of engagement level of an element of a measured performance, while a second membership function may indicate a degree of technical skill level of a subject thereof, or another measurable value pertaining to a measured performance. Continuing the example, an output linguistic variable may represent, without limitation, a score value. An inference engine may combine rules, such as: "if the engagement level is 'high and the technical skill level is 'high', the performance score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 3, a measured performance to be used may be selected by user selection, and/or by selection of a distribution of output scores, such as 30% proficient, 40% moderate average, and 30% below average or the like. Each score may be selected using an additional function such as degree of engagement level as described above.

Figure 4:
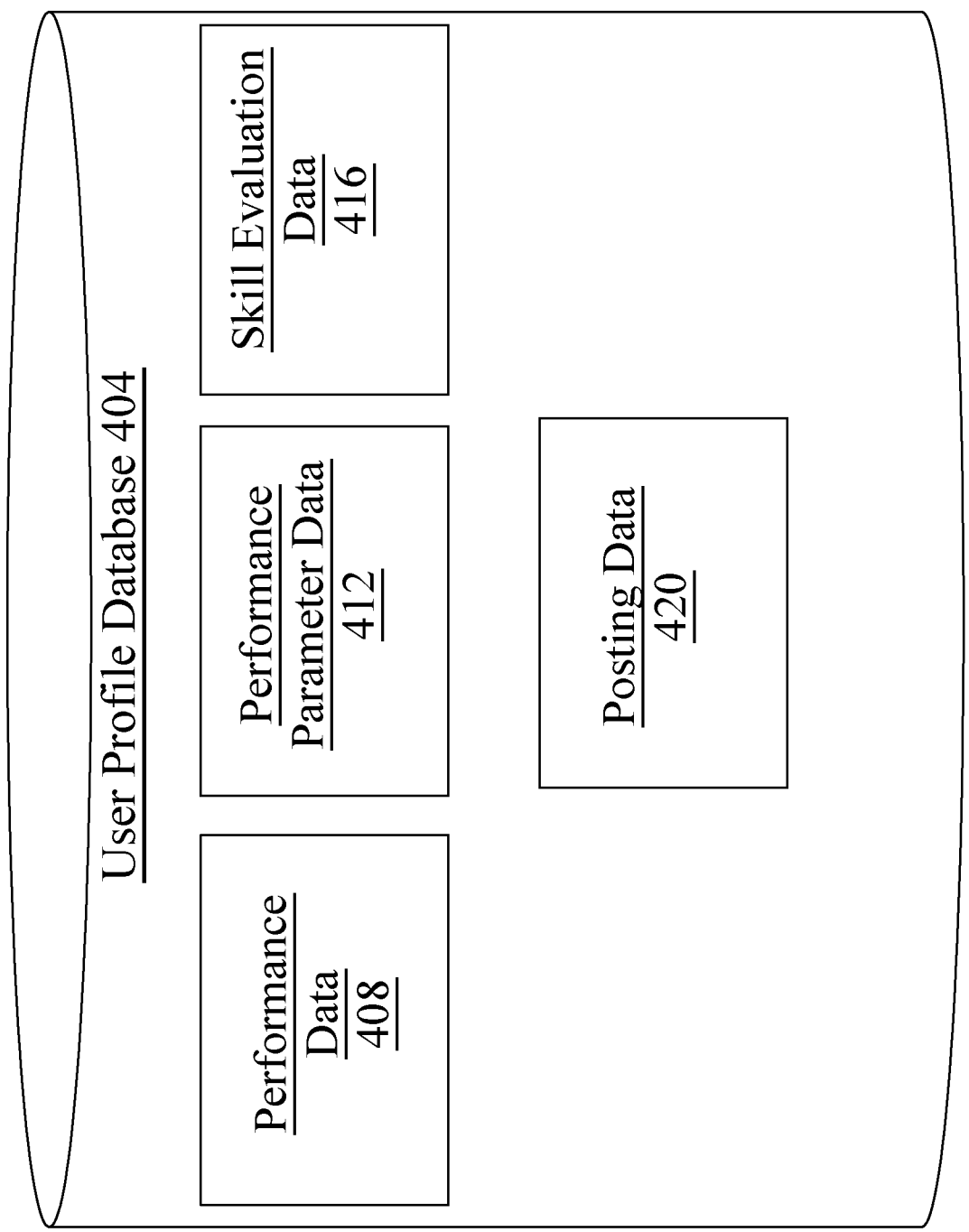
FIG. 4 is an exemplary embodiment of a block diagram of a user profile database.

Referring now to FIG. 4, user profile database 404 is shown. User profile database 404 may be implemented, without limitation, as a relational database, a key-value retrieval database such as a NOSQL database, or any other format or structure for use as a database that a person skilled in the art would recognize as suitable upon review of the entirety of this disclosure. User profile database 404 may alternatively or additionally be implemented using a distributed data storage protocol and/or data structure, such as a distributed hash table or the like. User profile database 404 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 4, user profile database 404 may include performance data 408. Performance data 408 may include performance data as described above with reference to FIG. 1. In some embodiments, performance data 408 may include categories of performance, such as, but not limited to, social skills, technical knowledge, and the like. Performance data 408 may be updated through user input, external computing devices, and/or previous iterations of processing.

Still referring to FIG. 4, user profile database 404 may performance parameter data 412. Performance parameter data 412 may include performance parameter data as described above with reference to FIG. 1. Performance parameter data 412 may include, but is not limited to, ideal performance values, performance metrics, and the like. For instance and without limitation, performance parameter data 412 may include engagement levels of participants, lengths of skill evaluations, quantity of answered prompts, and the like. Performance parameter data 412 may be updated through user input, external computing devices, and/or previous iterations of processing.

Still referring to FIG. 4, user profile database 404 may skill evaluation data 416. Skill evaluation data may include information pertaining to a skill evaluation. In some embodiments, skill evaluation data 416 may include, but is not limited to, type of skill evaluation, postings related to a skill evaluation, skill evaluation locations, skill evaluation participants, and the like. Skill evaluation data 416 may be updated through user input, external computing devices, and/or previous iterations of processing.

Still referring to FIG. 4, user profile database 404 may include posting data 420. Posting data 420 may include posting descriptions as described above with reference to FIG. 1. In some embodiments, posting data 420 may include, but is not limited to, posting category, posting similarity to performance data 408, previously accepted postings, previously rejected postings, and the like. Posting data 420 may be updated through user input, external computing devices, and/or previous iterations of processing.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include measured performances and outputs may include postings.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to posting categories, performance data categories, skill evaluation categories, and the like.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include performance data as described above as inputs, measured performances as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
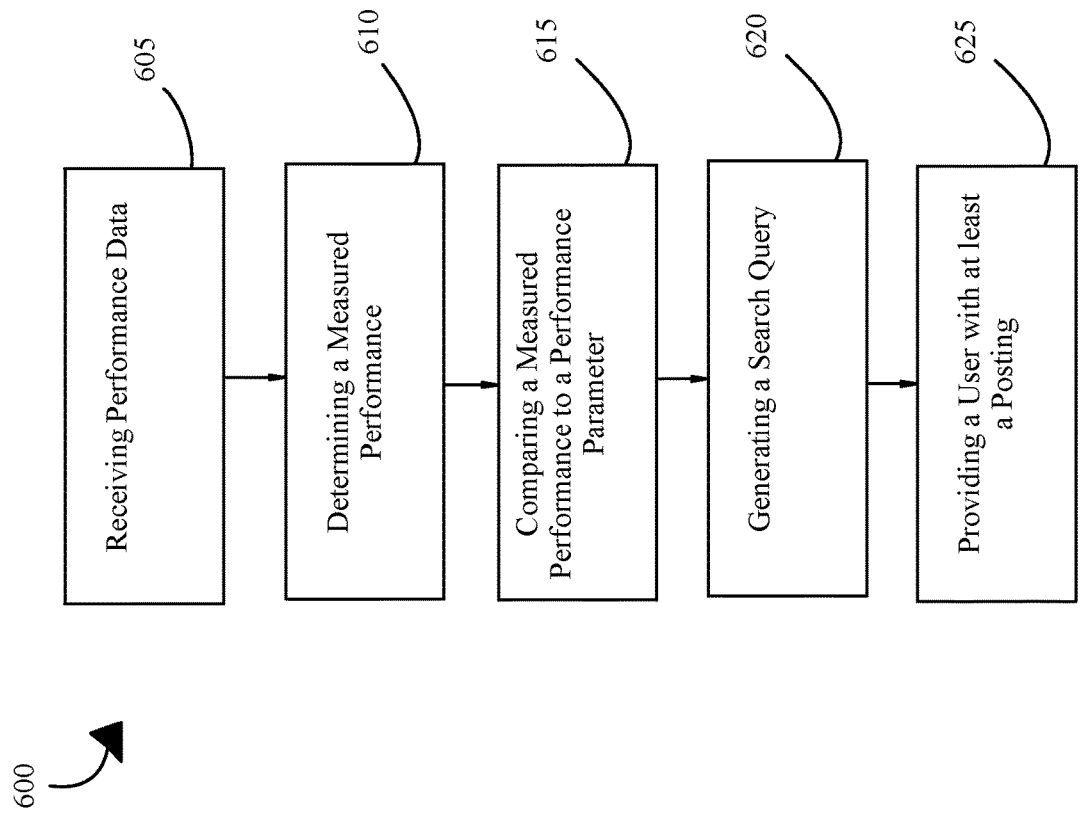
FIG. 6 is an exemplary embodiment of a flowchart of a method of performance matching.

Referring now to FIG. 6, a method 600 of performance matching is presented. At step 605, method 600 includes receiving performance data. Performance data may be received from a skill evaluation of a user and/or a participant of a skill evaluation. This step may be implemented, without limitation, as described above in FIGS. 1-5.

Still referring to FIG. 6, at step 610, method 600 includes determining a measured performance. Determining a measured performance may include measuring a performance of a user engaged in a skill evaluation. A performance may be measured through performance data. This step may be implemented, without limitation, as described above in FIGS. 1-5.

Still referring to FIG. 6, at step 615, method 600 includes comparing a measured performance to a performance parameter. In some embodiments, a measured performance may be compared to a performance parameter using an objective function. This step may be implemented, without limitation, as described above in FIGS. 1-5.

Still referring to FIG. 6, at step 620, method 600 includes generating a search query. A search query may be generated as a function of a comparison of a performance to a performance parameter. This step may be implemented, without limitation, as described above in FIGS. 1-5.

Still referring to FIG. 6, at step 625, method 600 includes providing a user with at least a posting. A user may be provided with at least a posting as a function of a search query. Providing a user with postings may include providing a ranked list of postings to a user. This step may be implemented, without limitation, as described above in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
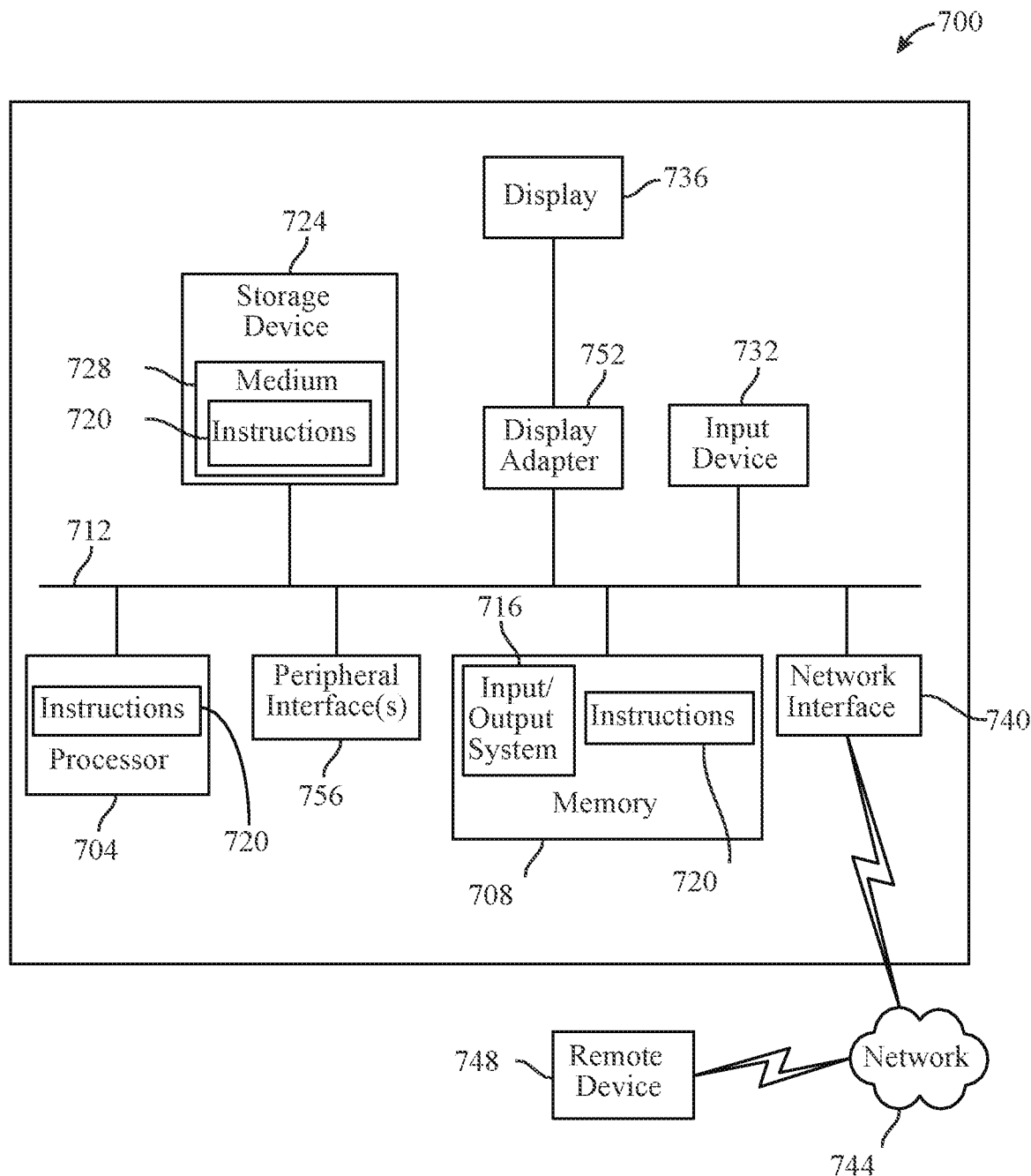
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Still referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Still referring to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for performance matching, comprising:
at least a processor; and
a memory communicatively connected to the processor, the memory containing instructions configuring the at least a processor to:
receive performance data of a user performing a skill evaluation, wherein the performance data comprises social skills;
measure an engagement level of a participant of the skill evaluation as a function of at least an interaction between the user and the participant;
determine a measured performance of the user as a function of the performance data and the engagement level;
compare the measured performance to a performance parameter comprising an ideal response, wherein comparing the measured performance to the performance parameter comprises:
receiving training data correlating skill evaluation prompts to ideal responses;
training an ideal response machine learning model with the training data, wherein the ideal response machine learning model is configured to input skill evaluation and output ideal responses; and
determining the ideal response as a function of the ideal response machine learning model;
generate, as a function of the comparison, a search query; and
provide the user with at least a posting as a function of the search query.

2. The apparatus of claim 1, wherein the performance data includes at least a vocal response.

3. The apparatus of claim 1, wherein the at least a processor is further configured to determine a user profile as a function of the measured performance.

4. The apparatus of claim 3, wherein the at least a processor is further configured to compare the user profile to a user profile of a second user.

5. The apparatus of claim 1, wherein generating the search query includes:
generating a search index utilizing a web crawler function; and
generating the search query as a function of the search index.

6. The apparatus of claim 1, wherein the at least a processor is further configured to provide at least a skill evaluation improvement recommendation to the user.

7. The apparatus of claim 1, wherein comparing the measured performance to the performance parameter includes:
generating an objective function of the measured performance and the performance parameter; and
comparing the measured performance to the performance parameter as a function of the objective function.

8. The apparatus of claim 1, wherein determining the measured performance of the user includes determining the measured performance utilizing a fuzzy logic system.

9. The apparatus of claim 1, wherein the at least a processor is further configured to provide the user with a ranked list of postings.

10. The apparatus of claim 1, wherein the at least a processor is further configured to:
receive training data correlating performance data to postings;
train a performance machine learning model with the training data, wherein the performance machine learning model is configured to input performance data and output postings; and
determine a posting match as a function of the performance machine learning model.

11. A method of performance matching using at least a processor, comprising:
receiving performance data of a user performing a skill evaluation, wherein the performance data comprises social skills;

measuring an engagement level of a participant of the skill evaluation as a function of at least an interaction between the user and the participant;

determining a measured performance of the user as a function of the performance data and the engagement level;

comparing the measured performance to a performance parameter comprising an ideal response, wherein comparing the measured performance to the performance parameter comprises:

receiving training data correlating skill evaluation prompts to ideal responses;

training an ideal response machine learning model with the training data, wherein the ideal response machine learning model is configured to input skill evaluation and output ideal responses; and determining the ideal response as a function of the ideal response machine learning model;

generating, as a function of the comparison, a search query; and providing the user with at least a posting as a function of the search query.

12. The method of claim 11, wherein the performance data includes at least a vocal response.

13. The method of claim 11, wherein comparing the performance further comprises determining a user profile as a function of the measured performance.

14. The method of claim 13, further comprising comparing the user profile to a user profile of a second user.

15. The method of claim 11, wherein generating the search query includes:

generating a search index utilizing a web crawler function; and generating the search query as a function of the search index.

16. The method of claim 11, wherein the at least a processor is further configured to provide skill evaluation improvement recommendations to the user.

17. The method of claim 11, wherein comparing the measured performance to a performance parameter includes:

generating an objective function of the measured performance and the performance parameter; and comparing the measured performance to the performance parameter as a function of the objective function.

18. The method of claim 11, wherein determining the measured performance of the user includes determining the measured performance utilizing a fuzzy logic system.

19. The method of claim 11, wherein providing the user with opportunity listings further comprises providing the user with a ranked list of postings.

20. The method of claim 11, wherein comparing the performance to a performance parameter further comprises:

receiving training data correlating performance data to postings;

training a performance machine learning model with the training data, wherein the performance machine learning model is configured to input performance data and output postings; and determining a posting match as a function of the performance machine learning model.

* * * * *